N. R. THIBERT.
FOOT PROPELLED VEHICLE.
APPLICATION FILED SEPT. 16, 1907.

941,471.

Patented Nov. 30, 1909.
2 SHEETS—SHEET 1.

Witnesses:

Inventor:
N. R. Thibert
By Attorneys
Southgate & Southgate

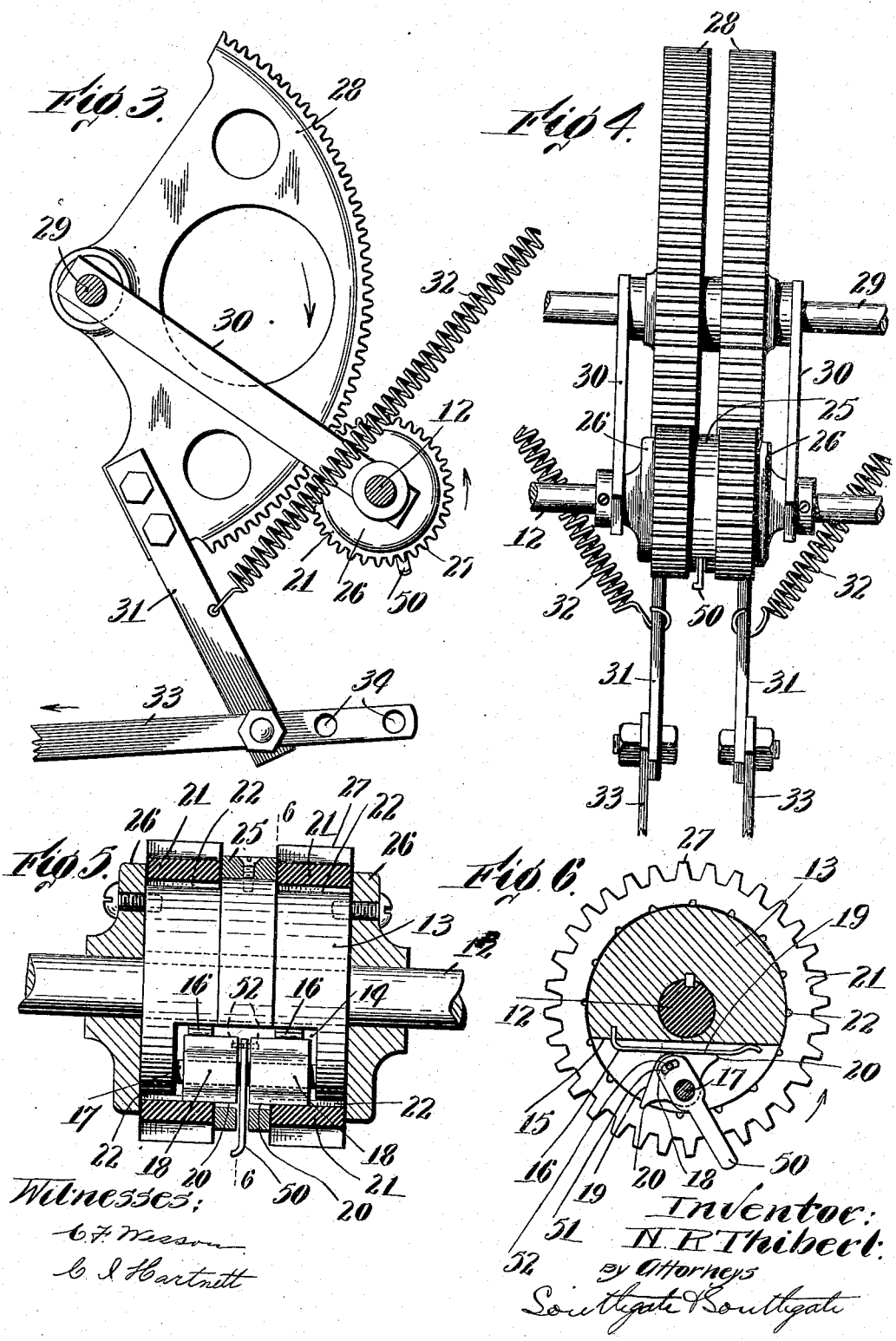

UNITED STATES PATENT OFFICE.

NAPOLEON R. THIBERT, OF WORCESTER, MASSACHUSETTS, ASSIGNOR TO ALFRED THOMAS AND MATTHEW J. WHITTALL, BOTH OF WORCESTER, MASSACHUSETTS.

FOOT-PROPELLED VEHICLE.

941,471.            Specification of Letters Patent.      Patented Nov. 30, 1909.

Application filed September 16, 1907. Serial No. 393,206.

*To all whom it may concern:*

Be it known that I, NAPOLEON R. THIBERT, a citizen of the United States, residing at Worcester, in the county of Worcester and State of Massachusetts, have invented a new and useful Foot-Propelled Vehicle, of which the following is a specification.

Many kinds of ratchet mechanisms, some of which have been operated by segmental gears meshing with ratchet pinions have been designed for operation by means of pedals to propel small vehicles, such as bicycles, velocipedes, and the like.

This invention relates to a device of this general character which is adapted for use on four-wheeled vehicles of various sizes and designs, and which is especially adapted for use on the toy automobiles, so as to fit them for being propelled by children.

The principal objects of the invention are to provide an efficient and simple mechanism for this purpose; to provide an improved series of connections between the pedals and the ratchet mechanism; to provide an improved way of supporting the pedals and transmitting power to the driving shaft; to provide an improved manner of constructing and assembling the ratchet pinions and their connected operating mechanism; and generally to provide a simple and effective arrangement of parts for propelling a vehicle of this character.

Reference is to be had to the accompanying drawings which show a preferred form of the invention, and in which—

Figure 1:
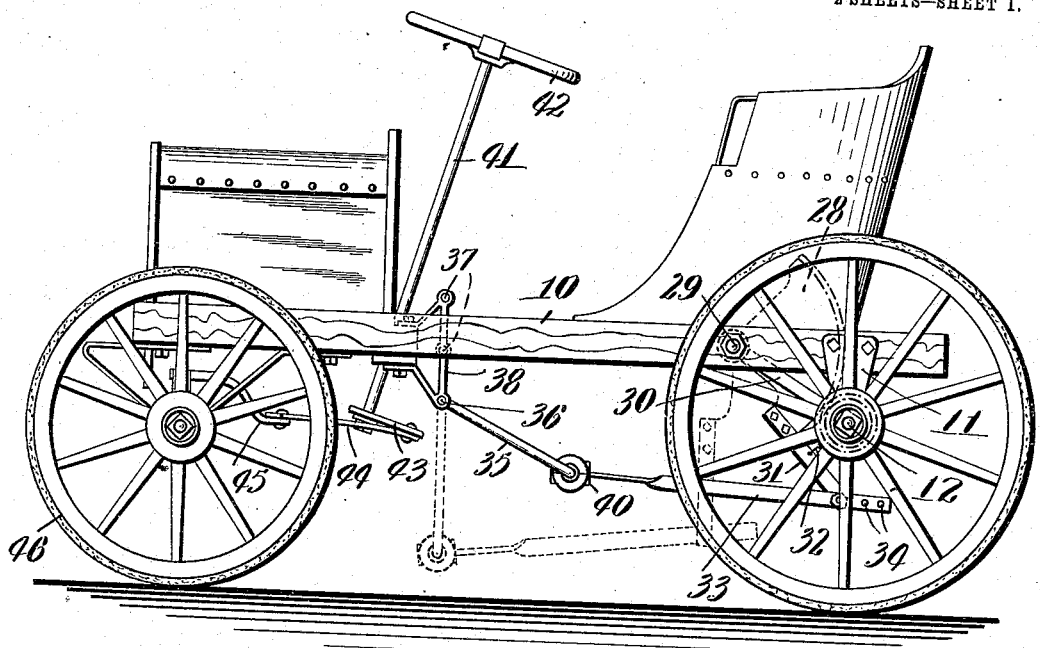
Figure 2:
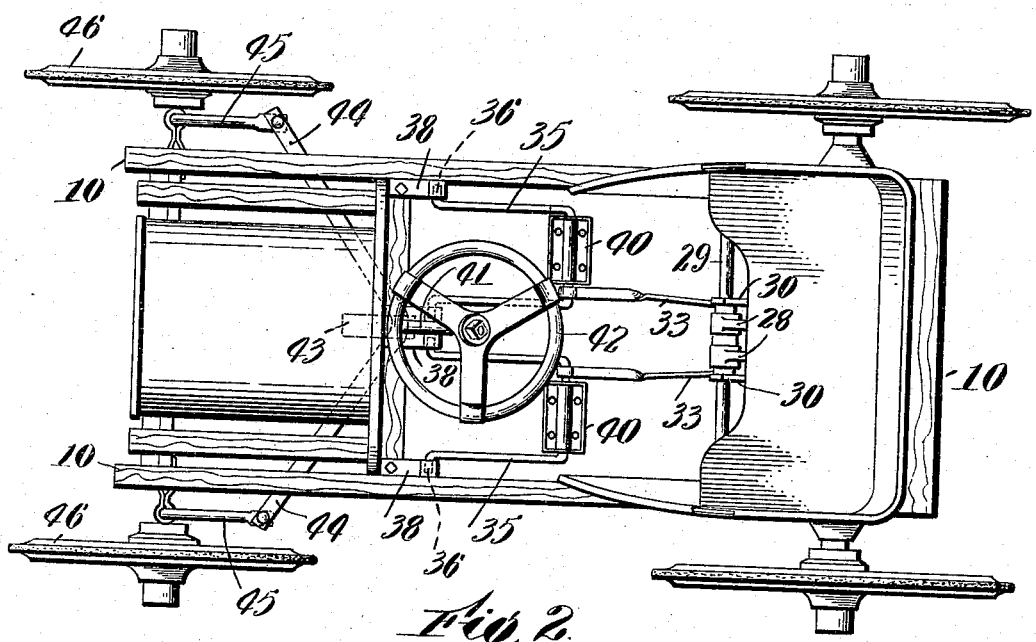

Figure 1 is a side elevation of a small imitation automobile suitable for being propelled by children exhibiting the features of this invention. Fig. 2 is a plan of the same. Fig. 3 is a side elevation of the segmental gears and connected parts. Fig. 4 is an end elevation of the same. Fig. 5 is a central vertical sectional view of the ratchet mechanism, and Fig. 6 is a sectional view of the same on the line 6—6 of Fig. 5.

I have shown in the drawings a vehicle made in a very simple manner having a frame 10 provided with hangers or brackets 11 on which are journaled a rear driving shaft 12. On this shaft are fixed a pair of disks 13, each having a notch 14 cut away therein of sectoral shape and provided with a flat surface 15. On this surface is located a spring 16 in flat shape, but bent sufficiently to normally lie slightly from this surface.

A shaft 17 passes through the two disks and is rotatably mounted so that it may be turned. This shaft is provided with a pair of triangular pawls 18 having flat surfaces 19 adapted to engage the spring as indicated, so that when in one position it will hold one tooth 20 of the pawl beyond the periphery of the disks, and in the other position will hold the opposite tooth beyond the periphery of the disks in the other direction.

Mounted to turn on each of the disks is a ratchet wheel 21 having notches 22 in its inner surface with which the teeth 20 are adapted to engage. It will be observed that when the pawls are in the position shown, the rotation of the ratchet wheel in the direction of the arrow will cause the disks, and consequently the shaft, to rotate, while the rotation of the ratchet wheel in the other direction will have no effect upon the disks and shaft. For reversing the operation, the pawl is turned in the opposite direction. This may be done in any desired way, that illustrated herein comprising a lever 50 mounted to turn on the shaft 17 and having a slot 51 in its end in which engage the ends of a pair of pins 52 mounted on the two pawls. On account of the slot the pawls will be free to play slightly as they are ratcheted over the notches 22, but the turning of the lever will reverse both pawls.

The ratchet wheels 21 are held in position by a ring 25 fixed to the disks, and by a pair of plates 26 also fixed to the disks. These plates and the ring extend outwardly far enough to form a channel in which the ratchet wheels rotate. It will be understood that the two disks 13 may be formed integral with each other and preferably are, as they always move together with the shaft, and therefore constitute a single element.

The ratchet wheels are provided with gear teeth 27 and so constitute pinions adapted to be operated by segmental gears 28. These segmental gears are mounted freely to turn on a stud 29 supported by the frame. This stud is connected with the driving shaft 12 by means of a pair of tie rods 30, so that these parts are not likely to get out of position, and the gears will always remain in mesh with the pinions. This also strengthens the construction of the vehicle frame itself.

For the purpose of operating the segmental gears in an efficient way so that the device may be manipulated efficiently with comparatively little power, an arm 31 is fixed at one end of each segmental gear, but extends a considerable distance therefrom. Between the gear and the end of the arm a spring 32 is connected with the arm, and the opposite end of the spring being connected with the frame, and its function being to pull the segmental gear back after it has been pushed forward as will be described hereinafter.

Pivotally connected with the end of the arm 31 is a link 33. This link has a plurality of holes 34 so that it may be connected with the arm in adjusted positions for a purpose which will be described. The opposite end of the link is supported by the bend of a U-shaped link 35. This link being of a general U-shaped construction is provided with two outwardly projecting feet 36 which are adapted to enter holes 37 in a pair of brackets 38. These feet constitute pivots for supporting the links 35, and the latter depending from them are pivotally connected with the links 33 as has been stated.

It will be noted that each bracket 38 is provided with a plurality of holes 37 at different elevations, so that the links 35 may be adjusted to accommodate different conditions, the links 33 also being adjusted with respect to the arms 31. The bends at the bottoms of the links 35 are provided with pedals 40 by which the device is operated. It will be seen that both pedals operate in the same way, and that being operated alternately there will always be a force on the driving shaft to rotate it, and that the transmission of the power of the pedals to the ratchet mechanism is made very efficient by the construction set forth, and is also adjustable so that the same machine may be used by children of different sizes.

On the front of the frame through the central one of the brackets 38, a shaft 41 extends upwardly in an inclined direction and has a steering wheel 42 on its upper end. On the lower end this shaft has an arm 43 which is pivotally connected with a frame 44 extending to both sides of the vehicle. This frame is pivotally connected with arms 45 which control the stub axles on which the front wheels 46 are mounted, consequently the device can very readily be steered by this arrangement.

While I have illustrated and described a preferred form of the invention I am aware that many modifications may be made therein by any person skilled in the art without departing from the scope thereof as expressed in the claims. Therefore I do not wish to be limited to the particular form shown, but What I do claim is:—

1. In a foot-propelled vehicle, the combination with the driving axle, of a disk fixed thereon, a pawl on the disk, a ratchet wheel having notches with which said pawl is adapted to engage, said pawl having a flat side, a flat spring supported by the disk to engage the flat side of the pawl and to hold it yieldingly against the notches, said ratchet wheel having gear teeth, a segmental gear hung to swing in mesh with said gear teeth to turn the ratchet wheel, and means for oscillating the segmental gear.

2. In a foot-propelled vehicle, the combination with the driving axle, of a disk fixed thereon, a pawl on the disk, a ratchet wheel having notches with which said pawl is adapted to engage, said pawl having a flat side, a flat spring supported by the disk to engage the flat side of the pawl and to hold it yieldingly against the notches, said ratchet wheel having gear teeth, a segmental gear hung to swing in mesh with said gear teeth to turn the ratchet wheel, and means for oscillating the segmental gear, said means comprising a link pivotally connected with said segmental gear, a second link pivotally connected with the opposite end of the first link and pivotally supported, and a pedal connected with said links at the point at which they are pivotally connected.

3. In a foot-propelled vehicle, the combination with a driving axle, of a pair of disks fixed thereon, each disk having a sector-shaped notch cut therein provided with a flat side, a shaft journaled in said disks adjacent to said notches, a pair of pawls mounted on said shaft, a spring mounted on the flat surface of each of said notches and adapted to engage the pawls to hold them yieldingly in a certain position, a pair of ratchet wheels having notches, each surrounding one of said disks in such a position that the pawls engage them, said ratchet wheels having gear teeth on the outside thereof, a pair of segmental gears meshing with the gear teeth on said ratchet wheels, and a pedal connected with each segmental gear for operating the same.

4. In a foot-propelled vehicle, the combination with a frame, of a rear axle rotatably mounted thereon, a pair of disks fixed to said axle, pawls supported by said disks, a pair of ratchet wheels rotatably mounted on said disks, and having notches with which said pawls are adapted to engage, whereby the rotation of the ratchet wheels will rotate the disks and shaft, a pair of pawls fixed to the outside surfaces of said disks and extending beyond the inner edges of said ratchet wheels to hold them in position, a ring fixed with respect to said disks between them and bearing on the inner edges of the ratchet wheels, said ratchet wheels being provided with external gear-teeth, a stud mounted on the frame of said vehicle, a pair of ties connecting said stud with said shaft, a pair of gear segments mounted to oscillate on said stud and meshing with said gear teeth on the ratchet wheels, springs for normally holding said gear segments in one extreme position, and pedals connected with said segments for moving them in the other direction.

5. In a foot-propelled vehicle, the combination of the frame, a driving shaft rotatably mounted thereon, a ratchet mechanism for operating said driving shaft, a segmental gear oscillatably supported by the frame and adapted to drive said ratchet mechanism, an arm extending from one end of said segmental gear, a spring connected with said arm, a link adapted to be pivotally connected with the end of the arm in adjusted positions, a U-shaped link pivotally depending from the frame, the first named link being pivoted to the bend of said U-shaped link, and a pedal mounted on said bend for operating the ratchet mechanism.

In testimony whereof I have hereunto set my hand, in the presence of two subscribing witnesses.

NAPOLEON R. THIBERT.

Witnesses:
ALBERT E. FAY,
C. FORREST WESSON.